(continued)

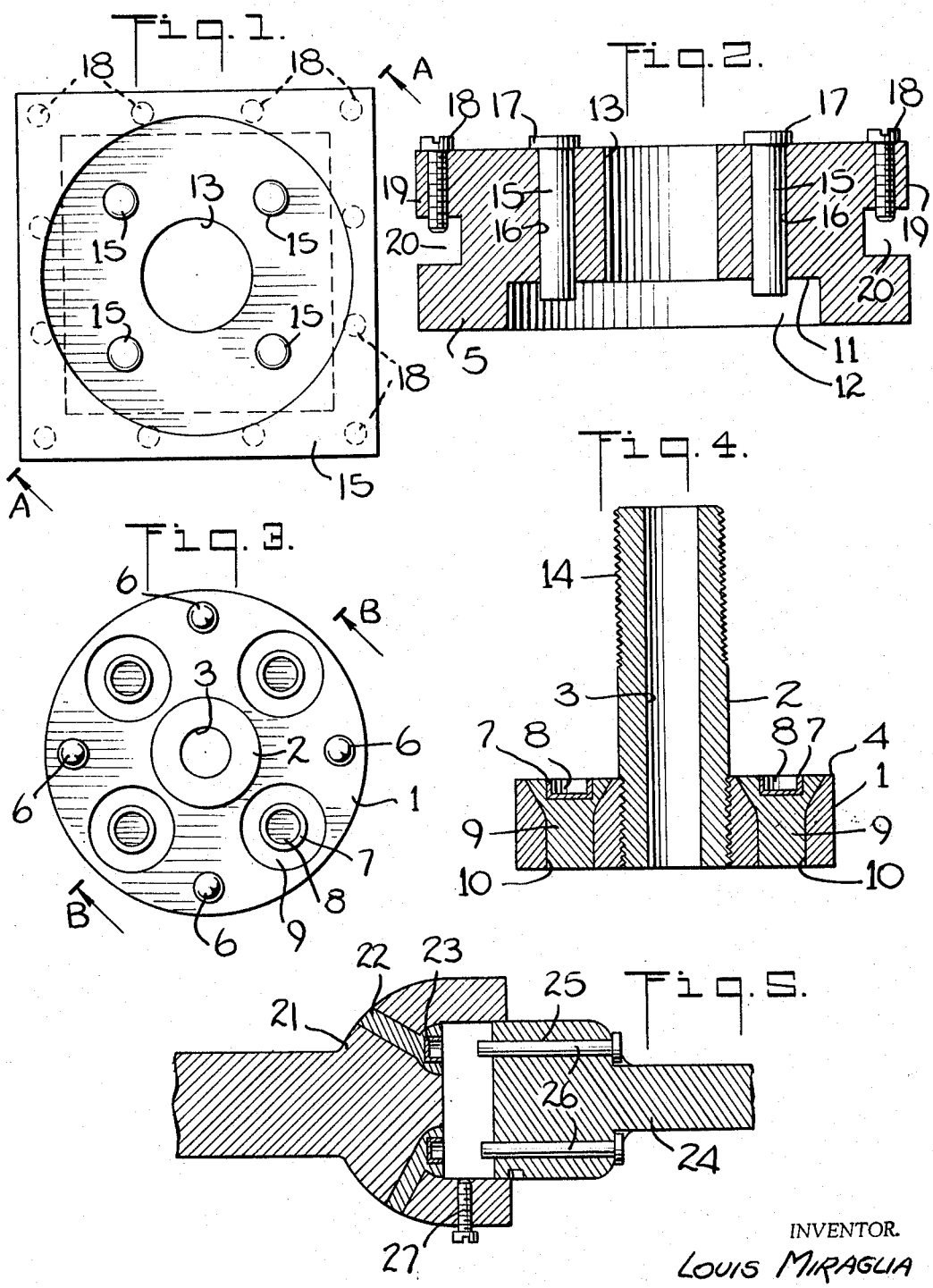

United States Patent Office
3,264,941
Patented August 9, 1966

3,264,941
PRECISE REPETITIVE POSITIONING DEVICE
Louis Miraglia, Navesink River Road, Red Bank, N.J.
Filed May 11, 1965, Ser. No. 451,246
16 Claims. (Cl. 90—11)

This invention relates to devices for precise repetitive positioning of metal machining equipment or of pieces to be machined, especially to accuracies of less than 0.0005 inch error and to a process for preparing such devices.

Many methods have been utilized in the past to index lathe tool turrets, milling machine tools and other metal working equipment, so that the position of the tool is accurate, especially when quick changes of tools or of work pieces are made.

The accuracy of such indexing is of extreme importance when a series of repetitive operations are to be performed, either on the same or a different work piece. It is necessary, for the highly precise machining carried out today, that each time a specific operation is repeated, the tool or the work piece be accurately positioned so that each operation results in accurate duplication of the preceding one. With the devices available today, accuracies down to 0.001 inch error are generally available but greater accuracies for many jobs now required by industry are possible only with special and expensive equipment. There is a need for greater accuracy at moderate cost and with common equipment.

Another disadvantage of indexing devices available today is that this device is the part of the metal machining apparatus which tends to wear out first from repeated use. Thus, a tool turret for a lathe which is constantly rotated in order to present the different tools needed for various steps will become worn out in the indexing device from the constant usage. The whole turret and its support must then be replaced, at considerable expense. Similarly, a quick change tool holder for a milling machine or the support for work pieces to be used in a milling machine has its positioning device as one of the weakest links since its wear and tear reduces the accuracy of the job. Here, too, when the positioning lock has become worn and positioning is inaccurate, the only cure is to replace whole parts of expensive machinery.

One of the simplest ways of positioning tools or work repeatedly is by pins or bolts which extend from the movable part into indexing holes in the base. Yet, great accuracy has hitherto been attainable only by relatively expensive special equipment. As the pins and holes get worn from repeated use, accuracy diminishes. Further, it is not possible to position two holes so as to match one another with as high a degree of accuracy as one hole alone can be bored.

I have found a device which permits precise repetitive positioning accurate to a degree not easily and cheaply attainable. It comprises an accurately machined indexing pin inserted into an accurately positioned hole in the movable part of the machine device and matching an accurately positioned bushing in the support for said movable part, the said bushing being imbedded in a plug of lower melting alloy which has been cast around it when it was positioned by the said accurately positioned pins.

The invention which is herein claimed may be more clearly understood with reference to the drawing, in which:

FIGURE 1 is a bottom view of a movable turret tool holder for a metal lathe;

FIGURE 2 is a sectional side elevation of said movable turret along the lines A—A in FIGURE 1;

FIGURE 3 is a top plan view of the base on which said movable turret rests;

FIGURE 4 is a sectional elevation of said base along the line B—B; and

FIGURE 5 is a schematic sectional view of another embodiment, namely a milling machine quick change tool holder and the butt end of a tool being inserted therein, the said section being taken longitudinally through the center of each said parts.

The tool turret for metal lathes shown in FIGURES 1 to 4 forms one of the important embodiments of this invention. The base 1 for the turret is a cylindrical piece of metal having along its center axis a pivot 2 threaded into its center. This pivot 2 is shown in FIGURE 4 as a separate cylindrical metal piece threaded into the base 1 but it can be cut from the same piece of metal and, therefore, form an integral part of base 1. The pivot arm 2 is pierced by a hole 3 by which the base 1 is firmly fastened to the desired position on the carriage of a lathe (not shown) by means of a long threaded bolt and nut (not shown). The top face of said base 1, as shown in FIGURE 3, is the engaging face 4 on which the tool turret 5 rides when the device is assembled. On this engaging face 4 are inset a number (here shown as four) ballbearings 6 resting on springs in recesses in the face. These are placed there to permit freer rotation of the turret 4 when the device is assembled. Also, in the said engaging face 4 are imbedded four bushings 7, each having a 3/8 inch cup 8. The bushings 7 are imbedded in a plug 9 of low melting metal which completely fills, at least on the engaging face 4 side of the base 1, cavities 10 in said base 1.

The tool turret 5 has its bottom (or engaging) face 11 in the form of a cylindrical recess 12 of slightly larger diameter than base 1. A cylindrical hole 13 extends all the way through said tool turret 1 and is made slightly larger than pivot 2. When tool turret 5 is assembled on base 1, pivot 2 extends above the top of tool turret 5 and has threads 14 on which a suitable device such as a wing nut (not shown) can be used to tighten the tool turret in place. Four metal pins 15 extend through tool turret 5 into the recess 12. Pins 15 are inserted in holes 16 and are held by heads 17 so that the other ends of said pins 15 extend less than 3/8 inch into recess 12. Tool turret 5 has in the perimeter of its upper surface a plurality of tool locking screws 18 extending through an upper rim 19 into the tool holding recess 20 which rings said tool turret 5 and into which a plurality of lathe tools (not shown) are fastened.

When the indexing tool turret of this invention is assembled on a lathe, the tool turret 5 is placed on the base 1 with the pivot extending through hole 13. The turret engaging face 11 is then in contact with the base engaging face 4. The turret 5 can then rotate on ball bearings 6 until pins 15 engage the cups 8 in bushings 7. The diameter of pins 15 is accurately the same as the diameters of cups 8 in bushings 7. Whatever accuracy with which holes 16 have been positioned, their diameters known, and pins 15 constructed to fit holes 16 tightly, determines the accuracy of the position of the tools presented to the lathe. This is true because the way in which bushings 7 are positioned makes only the positioning of pins 15 the critical element. Preferably, the pins 15 are press fitted in holes 16 to exact accurate positioning. When base 1 is constructed, cavities 10 are empty. The bushings 7 are placed on the ends of pins 15 and the tool turret 5 is fastened on the base 10 with the pins 15 and bushings 7 extending into the cavities 10. The entire device is then inverted and the low melting alloy is poured molten into cavities 10 from the bottom through the channels provided. On cooling, bushings 7 have become imbedded in the engaging face 4 of base 1, their position being exactly determined by the positioning of holes 16. The multiplication of errors by multiple positioning of holes in both the base and the turret are thus avoided.

While the invention has been described in detail with respect to a tool turret for a lathe, in its broader aspects it has many other applications in the metal machining art. The accurate positioning of various tools for repeated use is needed in many other places. FIGURE 5 illustrates, schematically, how this invention can be used in a milling machine. The tool chuck 21 is similarly pierced by a cavity 22 filled with a low melting alloy, in which bushings 23 are imbedded. The milling tool 24 has its butt end pierced by holes 25 through which pins 26 are inserted. When the tool 24 is positioned in the chuck 21 by the engagement of pins 26 with bushings 23, tool 24 is locked in place by any suitable standard locking device, here shown as a screw 27.

The positions of the pins and bushings in FIGURE 5 can readily be reversed, with the pins in the chuck and bushings imbedded in each tool to be used in this chuck, each such set of bushings being positioned from the same pins and thus positioned accurately so that each tool has the same accurate position. The same reversal of pins and bushings can also be true in the tool turret shown in FIGURES 1 to 4.

Other kinds of machining apparatus in which this invention can be used include drill presses and boring machines. In such uses (as well as the milling machine) the holder for the work piece to be drilled is preferably indexed by pins through such holder into bushings imbedded in a firmly fixed base. The work piece holder can thus be accurately positioned for any position in which work must repeatedly be carried out on successive work pieces.

The alloy to be used in preparing the plug 9 can be any low melting alloy whose melting point is less than the annealing temperature of the material from which the machine tools are made and especially lower than those of the hard abrasive-resistant and shock-resistant materials used for the pins and bushings. In order that the casting around the bushings will be a firm part of the rest of the base or other part of the machine tool in which the bushings are imbedded, the alloy must have the property of expanding on cooling, i.e., have a negative coefficient of thermal expansion. It preferably should also be hard enough when cool to withstand shock. Various bismuth alloys are especially usable for this purpose, especially those with indium which adds the element of hardness. Such alloys, in varying proportions, are readily available on the market under a variety of trade names.

The pins and bushings used in this invention are, in contrast, manufactured of materials which are hard, abrasive-resistant and shock-resistant. Preferably, they are constructed of carbon or other hardenable steels, silicon carbide or similar materials.

The base and the support members in which the bushings and the pins are mounted can be constructed of any desirable material usually those substances usually used for construction of machine tools such as stainless or other steel or similar material. The engaging surfaces of the movable and fixed members should preferably be machined into complementary shapes to the accuracy to which the tool is intended to effect its positioning. The cavities into which the bushings are imbedded in one such member by casting around it a low melting alloy are in the engaging surface of that member and have some means for external access by liquid flow, such as a channel to another surface or a groove in the engaging surface running to its edge. There should also be a means to lock the members with the engaging surfaces in contact such as clamps, bolts, nuts or the like. There also should be some means for firmly fixing the base member to the machine tool's frame. This can also be by nuts, bolts, clamps, and the like or can be done by making the base member an integral part of that frame.

The pins should be big enough in diameter to lock the two parts rigidly together when the pins have engaged the bushings. Thus, they should be thick enough to be rigid. Beyond this they can be any size that is convenient. As for shape, they preferably are cylindrical since a round cross section will not be dependent on orientation in engaging the bushings. However, other shapes such as triangular, rectangular or other cross-sections can be used if the hole in which they are inserted is accurately positioned and shaped and the bushings are similarly shaped. The pins should extend sufficient distance beyond the engaging surface of the support member so as to be able to engage the bushings enough to lock the two members firmly. The pin must be long enough to enter the bushing and engage it. The less it engages, the less secure the locking. A distance of $\frac{1}{16}$ inch is normal for sufficient engagement with more preferred. The bushing similarly should have a cup which fits the pin tightly and have a cup at least as deep as the distance the pins extend beyond the engaging surface. While the bushings must be defined as imbedded in an engaging surface in a pocket of a special alloy, the method of inserting the pins can be varied. They are shown in the drawings as extending through a member from another surface. In such a case, they are preferably press fitted into the accurately drilled holes so as to make sure of their exact positioning. Equally they can be rigidly inserted in holes bored a short distance into the engaging surface or even be especially machined projections integrally part of that surface. The limiting factor is the accuracy with which such construction can be effected.

The geometrical arrangement and number of the pins and bushings depends on the job to be done by them. In the drawing they are shown as a symmetrical arrangement of four of each in a circle, both in the turret tool holder and in the milling machine chuck and tool butt. A minimum of three must be engaged at any one time in order to get proper accurate positioning. However, beyond this any number convenient could be chosen. Unsymmetrical arrangements can be used, which would bar locking in certain directions. One can have more bushings than pins, so that there are many positions in which the two engaging faces can be locked. One such use would be in a general positioning of work in a series of positions with the pins mounted in the work piece holder and the bushings in the work base of a milling machine. While one could also have more pins than bushings, such a situation requires the removal of the unused pins as positionings are changed. Consequently, the devices of this invention are defined on the basis of the number of pins present when they are engaged and locked in position. In such situation, at least as many bushings must be imbedded in one engaging surface as there are pins projecting from the other engaging surface.

It is a prime advantage of this invention that the worn locking mechanism can be replaced at nominal cost. This locking mechanism is the one part of many of the machine tools on which its use is intended which is most subject to wear. Turret tool holders, e.g., cost hundreds of dollars and the replacement of an entire one because the locking device is worn can be expensive. Similarly, milling machine quick change tool holders or tools or workpiece positioning devices are not inexpensive. Yet, when present locking devices become worn, an entire expensive tool part must be replaced. In contrast, when the positioning locking device of this invention becomes worn, the entire part need not be discarded. The plug of low melting alloy can be melted out and new pins and bushings can be put into place by repeating the original process—and all at very nominal cost compared with the cost of replacing a whole part of the machine tool. Thus, the replacement process forms a separate embodiment of this invention.

In its broadest aspect, this invention can be used with any desired degree of accuracy in positioning. The advantage of easy and cheap renewal of the locking device makes the use of this invention attractive even when the accuracy of positioning the pins is in ranges achievable with devices now commercially available (e.g., down to 0.001 inch error). It is, however, in the advantage of achieving accuracies hitherto attainable only with expensive and special equipment that this invention finds its greatest attractiveness. To be able to obtain such accuracies with the ordinary machines available to all is a tremendous advance in the art. Positioning devices of accuracies with less than 0.0005 inch error are at present only available when special and very expensive machines are brought. Thus, precise repetitive positioning devices of such accuracy form a preferred embodiment of the invention.

The accuracy of the positioning is solely a function of the accuracy with which a single hole can be positioned and its diameter controlled. In such an operation, good machining operators can readily attain accuracies of 0.0001 inch or even better and this is the only error in the accurate precise repetitive positioning of a machine tool by the device of this invention, whether it be used in lathe tool turrets, milling machine chucks, drill press or milling machine work piece holders or any other device needing such accurate repetitive positioning, and whether it be used in any commercially available metal working machine rather than a specially prepared expensively precise machine.

I claim:
1. A device for precise repetitive positioning of metal machining equipment in relation to the piece to be machined which comprises, in combination,
   (1) a movable and a fixed member each having complementary shaped engaging faces;
   (2) at least three rigid accurately positioned and dimensioned projections extending at least 1/16 inch from the engaging surface of one said member, the said projections being made of hard, shock-resistant and abrasive-resistant material; and
   (3) at least as many bushings in the engaging surface of the second said member as there are said projections in the engaging face of the first said member, said bushings being imbedded in a pocket of a low melting alloy completely filling the engaging surface exposure of pockets in said engaging surface, the said cavity being larger than said bushing and having a means for external access by liquid flow, the said alloy having a melting point lower than the annealing temperature of said hard, abrasive and shock-resistant material and having a negative thermal coefficient of expansion, said bushings being accurately positioned to engage said projections.

2. A device of claim 1 in which the said projections are close fitting pins inserted through accurately positioned holes from the side of said first member opposite the engaging face.

3. A device of claim 2 in which the position of the centers of said holes and the diameters of said holes and said pins are accurately known to have less than 0.0005 inch error.

4. A device of claim 1 in which the said first member is the movable member and the said second member is fixed.

5. A device for precise repetitive positioning of metalmachining equipment in relation to the piece to be machined less than 0.0005 inch error which comprises, in combination,
   (1) a base and a support for said machining equipment each having an engaging surface, the said engaging surfaces being shaped to complement one another and machined to better than 0.0005 inch accuracy;
   (2) the said base having in its engaging surface more than two bushings of hard, abrasive and shock-resistant material;
      (a) the said bushings being firmly imbedded in a plug of castable alloy;
         (i) the said plug completely filling the engaging surface exposure of a cavity in said base, the said cavity being appreciably larger than said bushing and having a means for external access by liquid flow;
         (ii) the said alloy having a melting point below the annealing temperature of said hard, abrasive and shock-resistant material and of the material from which said base and said support are constructed and having the further properties of a negative coefficient of thermal expansion and of being shock resistant;
   (3) the said support having in its engaging surface more than two, but no more than the number of said bushings, of pins of hard, abrasive and shock-resistant material inserted in and closely fitting accurately positioned holes;
      (a) the positions of the centers and the cross-section dimensions of said holes and said pins being accurately known to have less than 0.0005 inch error;
      (b) the said pins fitting said holes to less than 0.0005 inch tolerance, and projecting no further beyond the engaging surface of said support than the depth of the cup in said bushings;
   (4) the centers of more than two of said bushings being accurately positioned to less than 0.0005 inch error to match the centers of said pins;
   (5) means for locking said support and said base rigidly with said engaging surfaces in contact.

6. A rotatable turret tool holder for a metal-working lathe capable of precise repetitive positioning each tool to a position less than 0.0005 inch in error which comprises, in combination,
   (1) a base for said turret;
   (2) means for affixing said base to the carriage of said lathe;
   (3) a turret tool holder fitted with means for mounting metal-working lathe tools;
   (4) the said base and the said tool holder each having an engaging surface, shaped to complement one another, machined to better than 0.0005 inch accuracy;
   (5) the said base having in its engaging surface more than two bushings of hard abrasive and shock-resistant material;
      (a) the said bushings being firmly imbedded in a plug of castable alloy;
         (i) the said plug completely filling a cavity in the engaging surface of said base, the said cavity being appreciably larger than said bushing and having means for external access by liquid flow;
         (ii) the said alloy having a melting point below the annealing temperature of said hard, abrasive and shock-resistant material and of the material from which said base and said support is constructed and having the further properties of a negative coefficient of thermal expansion and of being shock and abrasive-resistant;
   (6) the said tool holder having in its engaging surface more than two but no more than the number of said bushings of accurately dimensioned pins of hard, abrasive and shock-resistant material inserted and closely fitting accurately positioned holes;
      (a) the positions of the centers and the cross-section dimensions of said holes being accurately positioned to less than 0.0005 inch error;
      (b) the said pins fitting said holes to less than 0.0005 inch tolerance and projecting beyond the said engaging surface no further than the depth of said cup in said bushings;

(7) the centers of said bushings being accurately positioned to less than 0.0005 inch error to match the centers of more than two said pins;
(8) means for rotatably mounting said tool holder on said base with said engaging surfaces in contact; and
(9) means for rigidly affixing said tool holder to said base with the said engaging surfaces in contact and said pins engaging said cups in said bushings.

7. A device of claim 5 in which said base is a quick change tool holder of a milling machine and the said support for machining equipment is the butt end of a tool for use in said milling machine.

8. A device for accurately positioning pieces to be machined to less than 0.0005 inch error which comprises, in combination,
(1) a base and a support for said piece to be machined each having an engaging surface, the said engaging surfaces being shaped to complement one another and being machined to better than 0.0005 inch accuracy;
(2) the said base having in its engaging surface more than two bushings of hard, abrasive and shock-resistant material;
    (a) the said bushings being firmly imbedded in a plug of castable alloy;
        (i) the said plug completely filling the engaging surface exposure of a cavity in said base, the said cavity being appreciably larger than said bushing and having a means for external access by liquid flow;
        (ii) the said alloy having a melting point below the annealing temperature of said hard, abrasive and shock-resistant material and of the material from which said base and said support are constructed and having the further properties of a negative coefficient of thermal expansion and of being shock-resistant;
(3) the said support having in its engaging surface more than two, but no more than the number of said bushings of pins of hard, abrasive and shock-resistant material inserted in and closely fitting accurately positioned holes;
    (a) the positions of the centers and the cross-section dimensions of said holes and said pins being accurately known to have less than 0.0005 inch error;
    (b) the said pins fitting said holes to less than 0.0005 inch tolerance, and projecting beyond the engaging surface of said support no further than the depth of the cup in said bushings;
(4) the centers of more than two of said bushings being accurately positioned to less than 0.0005 inch error to match the centers of said pins;
(5) means for locking said support and said base rigidly with said engaging surfaces in contact.

9. A process for manufacture of a device for precise repetitive positioning of metal machining equipment in relation to the piece to be machined which comprises, in combination,
(1) preparing a movable and a fixed member with complementarily shaped engaging surfaces and having means for locking said members with said engaging surfaces in contact;
    (a) the engaging surface of one said member having accurately positioned, shaped and dimensioned projections;
    (b) the engaging surface of the second said member having cavities positioned in its engaging surface in position to receive said projections when the engaging surfaces of said members are in contact, the cavities being much larger than said projections and being shaped with means for access by liquid flow from the outside when engaging surfaces of said members are in contact;
    (c) said projections being formed of hard, abrasive and shock-resistant material;
(2) placing on said projections cup shaped bushings made of hard, abrasive and shock-resistant material;
(3) placing said members with said engaging surfaces in contact and casting a plug of low melting alloy around each said bushing, using the means for access by liquid flow to said cavities;
    (a) adding to said cavities sufficient of said alloy to completely fill said cavity at said engaging surface;
    (b) said low melting alloy having a melting point less than the annealing temperature of said hard, abrasive and shock-resistant material and of the materials from which said members are constructed, and having a negative coefficient of thermal expansion; and
(4) cooling said members to solidification of said plugs.

10. A process of claim 9 in which the projections are formed by close-fitting pins inserted through accurately positioned holes from the side of the first said member opposite said engaging surface.

11. A process of claim 9 in which the positions and dimensions of said projections and said bushings are accurately known to have less than 0.0005 inch error.

12. A process of claim 9 in which the first said member is the movable member and the second said member is the fixed member.

13. A process of preparing a device for precise repetitive positioning of metal machining equipment in relation to the piece to be machined, which comprises:
(1) using a fixed and a movable member with complementarily shaped engaging surfaces
    (a) having means for locking said members together with said engaging surfaces in contact;
    (b) one said member having holes whose centers and diameters are accurately dimensioned and positioned to less than 0.0005 inch error;
    (c) the other said member having cavities in its engaging surface larger in diameter than said holes, positioned to meet said holes when said engaging surfaces are in contact, and having means for access by liquid flow from the outside;
(2) inserting indexing pins fitting said holes tightly to within 0.0005 inch error, said pins being constructed of hard, abrasive and shock-resistant material;
(3) covering the projecting tips of said pins with cup shaped bushings of hard, abrasive and shock-resistant material, the cups of said bushings fitting said tips tightly with less than 0.0005 inch error;
(4) casting around said bushings through said means for liquid access a plug of alloy melting below the annealing temperature of said hard, abrasive and shock-resistant materials and having a negative coefficient of thermal expansion, enough said alloy being used to establish a continuous surface around said bushings on said engaging surface; and
(5) cooling said casting to solidify said plug.

14. The process of claim 13 in which the first said member is a lathe turret tool holder and the second said member is the base for said tool holder.

15. The process of claim 13 in which the first said member is a milling machine chuck and the second said member is the butt of a milling machine tool.

16. The process of claim 13 in which the first said member is a device for holding work to be machined and the second said member is a base having means for rigid affixation to a machine tool.

No references cited.

WILLIAM W. DYER, JR., *Primary Examiner.*